United States Patent [19]

Howard et al.

[11] Patent Number: 4,555,257

[45] Date of Patent: Nov. 26, 1985

[54] OPTICAL FIBRE PULLING TOWER

[75] Inventors: Kenneth G. Howard, Dartford; Ian E. Little, Chislehurst, both of England

[73] Assignee: Standard Telephones and Cables Public Limited Company, London, England

[21] Appl. No.: 646,088

[22] Filed: Aug. 31, 1984

[30] Foreign Application Priority Data

Sep. 3, 1983 [GB] United Kingdom ................. 8323692

[51] Int. Cl.$^4$ .......................................... C03B 37/025
[52] U.S. Cl. ........................................ 65/13; 65/11.1; 65/374.15
[58] Field of Search ................... 65/11.1, 13, 374.15

[56] References Cited

U.S. PATENT DOCUMENTS

| 4,249,925 | 2/1981 | Kawashima et al. ............... 65/13 X |
| 4,331,463 | 5/1982 | Briere et al. ............................. 65/13 |
| 4,373,943 | 2/1983 | Gouronnec et al. ............... 65/13 X |

FOREIGN PATENT DOCUMENTS

| 2307502 | 8/1973 | Fed. Rep. of Germany ... 65/374.15 |
| 1523595 | 9/1978 | United Kingdom ............ 65/374.15 |

Primary Examiner—Robert Lindsay
Attorney, Agent, or Firm—Kerkam, Stowell, Kondracki & Clarke

[57] ABSTRACT

An optical fibre pulling tower is made of tubular modular substructures (5) of synthetic granite mounted one on top of the other by means of joining plates (6) cast in situ. A baseplate (13) sits on a concrete raft (14) and is adjustable to be exactly upright.

7 Claims, 3 Drawing Figures

OPTICAL FIBRE PULLING TOWER

The present invention relates to manufacturing optical fibre; particularly a pulling tower.

Optical fibre of the desired dimension is manufactured by heating one end of a preform to soften the preform and drawing fibre vertically from the molten preform. The strength the dimensional accuracy and the surface conditions of the fibre being drawn are critical parameters and depend heavily on the drawing process.

Typically the preform is 13 to 19 mm in diameter and 1000 to 1500 mm long. It is heated to 2000° C. and as the preform is fed into the hot zone and drawn from the molten state, the surface shape of the molten material determined by the viscous forces, surface tension and shear forces. The drawn fibre passes through a coating stage and is drawn by a fibre drawing capstan. Careful servo control is required to maintain accurately the fibre diameter and a good speed of production. The accuracy of alignment of the chuck in which the preform is held, the furnace and the coating application equipment is such that present day pulling towers can only maintain the diameter of the fibre to within ±1 micron.

According to the present invention there is provided an optical fibre pulling tower comprising an elongate structure and a preform holding chuck, a furnace and a coating application stage secured to the structure, characterised in that the structure is made of cast synthetic granite epoxy concrete or the like with metal mounting plates cast in situ, and in that the preform holding chuck, the furnace and the coating application stage are each secured to the structure by means of the metal mounting plates.

Preferably the structure comprises an assembly of modular tubular sub-structures mounted one on top of the other and joined together with metal joining plates also cast in situ.

In order that the invention can be clearly understood reference will now be made to the accompanying drawing in which.

Figure 1:
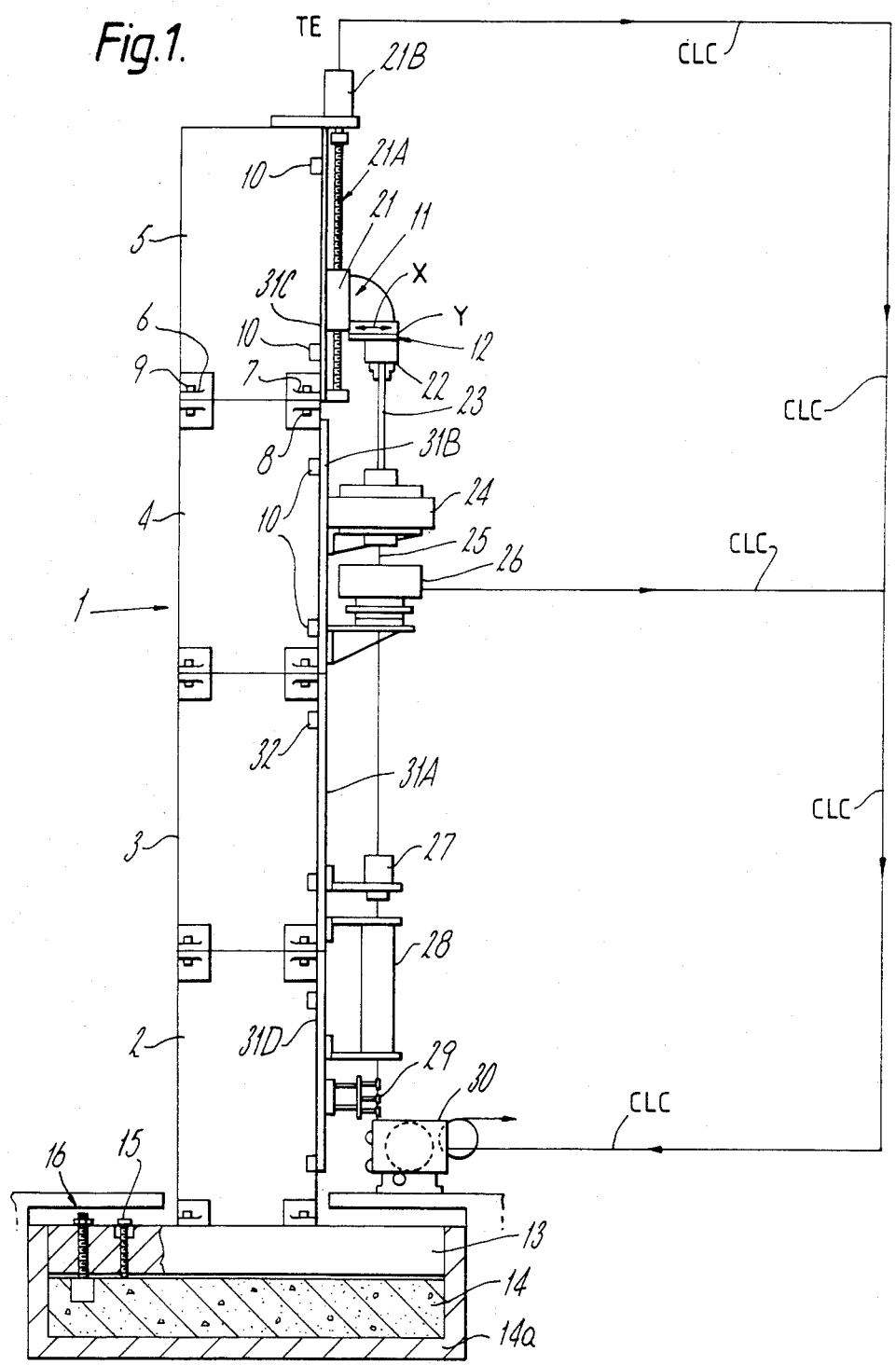
FIG. 1 is a side view of an optical fibre pulling tower according to an embodiment of the invention.

Referring to FIG. 1 of the drawings the pulling tower shown comprises an upright elongate tubular structure 1 formed from an assembly of tubular sub-structures 2, 3, 4 and 5. Each substructure is made by a casting process from a synthetic granite epoxy concrete, such as is sold under the trade name GRANITAN S-100. Each substructure has four metal joining plates such as 6 and 7 at each corner of each end of the tube so that the adjacent sub-structures such as 4 and 5 can be joined together with bolts such as 8 and 9. These plates are cast in situ when the substructure is cast.

A base plate 13 is bolted to the lowest substructure 2 via the joining plates and this rests on a concrete raft 14 via three points, itself resting on a bed of vibration-isolating material 14a. The inclination of the tower is adjustable to be vertical by screw 15 and locked by lockscrew 16.

On the front face (and on other faces if required) are cast metal mounting plates such as 10 which are also secured to the substructure by being cast in situ. Vertical mounting bars 31A, 31B, 31C and 31D are used to mount the various active parts of the pulling tower as shown. On the uppermost substructure is mounted a preform drive assembly 21 having a chuck 22 for holding the end of the preform 23 and movable up and down on a precision anti-backlash leadscrew 21A. This is driven by a preform drive servomotor 21B to control the feedrate. The preform chuck carriage 11 is mounted on linear vertical bearings on the tower and driven by the leadscrew 21A. The chuck 22 is mounted to the chuck carriage via an x-y positioning system indicated schematically by reference numeral 12.

A tension measuring device 29 measures the tension in the coated fibre before it enters the fibre drawing capstan unit 30 for onward transmission to a take up drum (not shown). The fibre diameter is closed-loop controlled by adjusting the capstan speed and the preform feed rate in dependence upon the fibre diameter measured by device 26. This closed-loop control is represented diagrammatically by the closed-loop control CLC lines.

Each of the parts just described is mounted on steel mounting bars 31 secured to the tower. These are secured by casting mounting plates 32 in the cast tubular substructures and bolting the bars 31 to the mounting plates.

The preform 23 is fed into a furnace 24 where it is drawn down to the desired fibre size. The diameter of the fibre 25 is measured by a laser scanning device 26.

The fibre passes then through a resin coating cone 27 and thence through a resin curing oven 28 to cure the resin.

Figure 2:
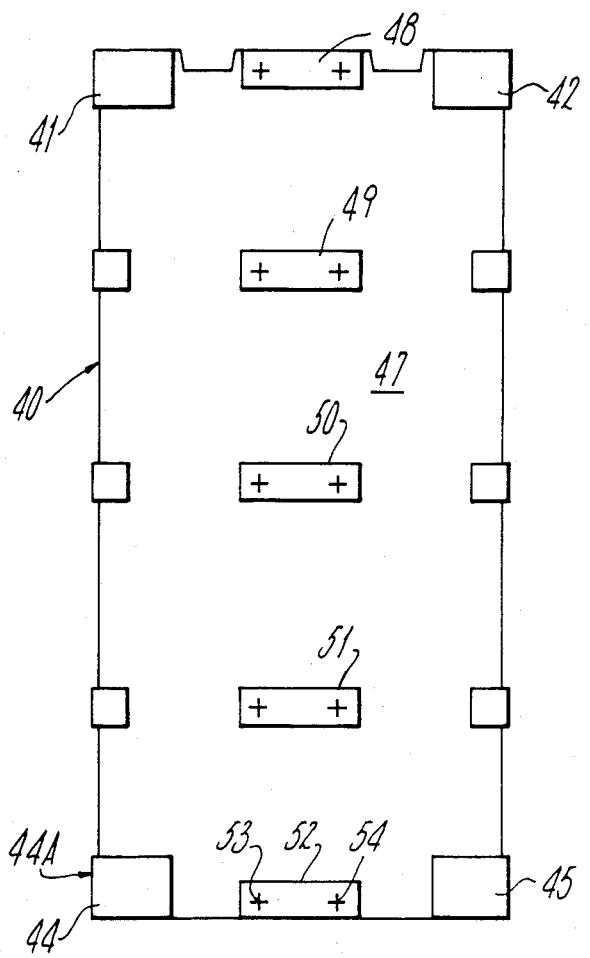
FIG. 2 is a front view of a substructure of another tower according to another embodiment of the invention.
Figure 3:
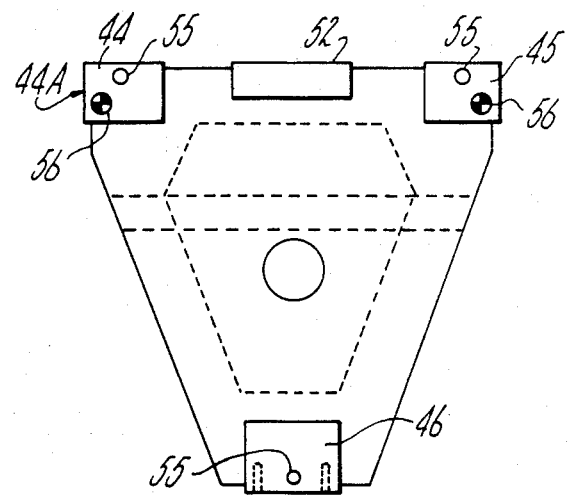
FIG. 3 is a plan view of the structure of FIG. 2.

Referring now to FIG. 2 there is shown a substructure of another pulling tower according to another embodiment of the invention. The substructure 40 is made and constructed in the same way as described with reference to the tower of FIG. 1. That is to say each substructure (there would be four as in FIG. 1, mounted one on top of the other) is made by the same casting process from the same material. Here though the substructure has a generally triangular tubular shape, as can be seen in FIG. 3, there being a metal joining plate 41, 42, 43 (not shown) at each corner at the top and similar joining plates 44, 45 and 46 at the bottom. The plates 41, 42, 44, 45 have three sides each side lying over an appropriate face of the substructure e.g. plate 44 has a side on the bottom as shown in FIG. 3, a side on the front face 47 as shown in FIG. 2, and a side (not shown) on the left hand side face of the substructure and indicated by the reference numeral 44A.

Along the front face 47 of the substructure are five metal mounting plates 48 to 52 each having a pair of threaded holes, such as 53 and 54 in plate 52, onto which are mounted the vertical mounting bars such as bars 31 shown in FIG. 1.

Each of the joining plates 41 to 46 has a fixing hole such as 55, and the two plates 44 and 45 at the bottom and 41 and 42 at the top each have a location hole such as 56 for accurately locating the substructure one above the other using dowel pins.

The tubular substructure has a web across the top and bottom of a thickness similar to that of the walls.

The tower would be mounted on a concrete raft in an adjustable way as described with reference to FIG 1.

The closed loop control CLC shown in FIG. 1 operates to maintain a desired fibre diameter as measured by laser device 26, by controlling the preform feed rate and the capstan speed.

The significant advantage of the pulling tower described is the absence of resonances in the structure. Previous towers have been made of metal and these structures have been found to "ring" and resonate such that the original accuracy of the drawn fibre cannot be maintained.

Furthermore the synthetic granite has a coefficient of linear expansion initially the same as that of steel. Thus the significant localised heating caused by the proximity of the furnace 24 will not cause any undue stresses to the set-up between the steel and the synthetic granite, thereby maintaining the accurate alignment of the mounted parts.

The synthetic granite has a low heat conductivity and this also minimises distortion. It has very good systematic stability, is non-hygroscopic and does not generate powder or dust particles.

The multimode fibre to be drawn on the pulling tower would have a 125 micron outside diameter to a tolerance of a quarter of a micron. The primary coating brings the diameter to 250-300 microns.

Monomode fibre with a 100 micron outside diameter primary coating and a core diameter of 5 to 8 microns could also be drawn to the same tolerances.

It is proposed to draw the fibre at 300 meters per minute.

We claim:

1. An optical fibre pulling tower comprising:
   an elongate structure made of case synthetic granite expoxy conrete with metal mounting plates case in situ; and
   a reform holding chuck, a furnace and a coating application stage each secured to the structure by means of the metal mounting plates.

2. A tower as claimed in claim 1, wherein the structure comprises an assembly of modular tubular sub-structures mounted one on top of the other.

3. A tower as claimed in claim 2, further comprising upright metal bars secured to the mounting plates, and wherein the preform holding chuck, the furnace and the coating application stage are mounted to the upright metal bars.

4. A tower as claimed in claim 2, wherein each of the sub-structures is of generally rectangular cross section having four joining plates, one at each corner of the rectangle, whereby adjacent sub-structures are jointed together.

5. A tower as claimed in claim 2, wherein each of the sub-structures has a generally triangular tubular cross section thereby defining three faces, with the metal mounting plates located on one of the faces.

6. A tower as claimed in claim 5, wherein a substructure has six joining plates, located at each apex of the triangle, three at one end of the substructure and the other three at the other end.

7. A tower as claimed in claim 2, comprising a joining plate is wrapped around an edge of the substructure.

* * * * *

UNITED STATES PATENT AND TRADEMARK OFFICE
CERTIFICATE OF CORRECTION

PATENT NO. : 4,555,257
DATED : November 26, 1985
INVENTOR(S) : Kenneth G. Howard and Ian E. Little It is certified that error appears in the above-identified patent and that said Letters Patent is hereby corrected as shown below:

Column 4, line 1 ( in Claim 1), after "made of" delete "case" and substitute therefor --cast--.

Column 4, line 29 (in Claim 7), after "plate" delete "is".

Signed and Sealed this

Eighth Day of April 1986

[SEAL]

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,555,257

DATED : November 26, 1985

INVENTOR(S) : Kenneth G. Howard and Ian E. Little

It is certified that error appears in the above-identified patent and that said Letters Patent is hereby corrected as shown below:

Column 4, line 1 (in Claim 1), after "made of" delete "case" and substitute therefor --cast--;

Column 4, line 2 (in Claim 1), correct the spelling of "expoxy conrete" to read --epoxy concrete--; after "plates" delete "case" and substitute therefor --cast--.

Column 4, line 4 (in Claim 1), delete "reform" and substitute therefor --preform--.

Column 4, line 29 (in Claim 7), after "plate" delete "is".

This Certificate supersede Certificate of Correction issued April 8, 1986.

Signed and Sealed this

Seventeenth Day of June 1986

[SEAL]

Attest:

DONALD J. QUIGG

Attesting Officer

Commissioner of Patents and Trademarks